United States Patent
Hirowatari et al.

(10) Patent No.: US 6,904,881 B2
(45) Date of Patent: Jun. 14, 2005

(54) APPARATUS AND METHOD FOR CONTROLLING INTERNAL COMBUSTION ENGINE

(75) Inventors: Seiji Hirowatari, Toyota (JP); Masanao Idogawa, Toyota (JP); Isao Takagi, Okazaki (JP); Hirohisa Kishi, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/936,685

(22) Filed: Sep. 9, 2004

(65) Prior Publication Data

US 2005/0051122 A1 Mar. 10, 2005

(30) Foreign Application Priority Data

Sep. 9, 2003 (JP) .................................... 2003-317219

(51) Int. Cl.[7] .................................................. F01L 1/34
(52) U.S. Cl. ............................ 123/90.15; 123/90.17; 123/90.31
(58) Field of Search ........................... 123/90.15, 90.16, 123/90.17, 90.18, 90.27, 90.31; 464/1, 2, 160

(56) References Cited

U.S. PATENT DOCUMENTS

6,494,173 B2 * 12/2002 Takahashi et al. ....... 123/90.15
6,526,930 B2 * 3/2003 Takahashi et al. ....... 123/90.17

FOREIGN PATENT DOCUMENTS

| JP | 64-066414 | 3/1989 |
| JP | 8-277729 | 10/1996 |
| JP | 10-299517 | 11/1998 |
| JP | 10-318001 | 12/1998 |
| JP | 2003-097302 | 4/2003 |

* cited by examiner

Primary Examiner—Thomas Denion
Assistant Examiner—Ching Chang
(74) Attorney, Agent, or Firm—Kenyon & Kenyon

(57) ABSTRACT

A controller restricts an operation amount of the variable valve actuation mechanism of a fluid pressure operated type such that increase in the valve overlap amount of an engine is restrained when the engine is in a transient operation state in which the output of the engine increases. When the controller determines that the variable valve actuation mechanism is in the locked state, the controller relaxes the restriction imposed on the operation amount of the variable valve actuation mechanism. Hence, a decrease in follow-up performance of valve properties to desired properties is restrained while restraining temporary stagnation of increase in engine rotational speed caused by vehicle acceleration.

20 Claims, 13 Drawing Sheets

Intake-side variable valve timing mechanism 17

Locked time

Unlocked time

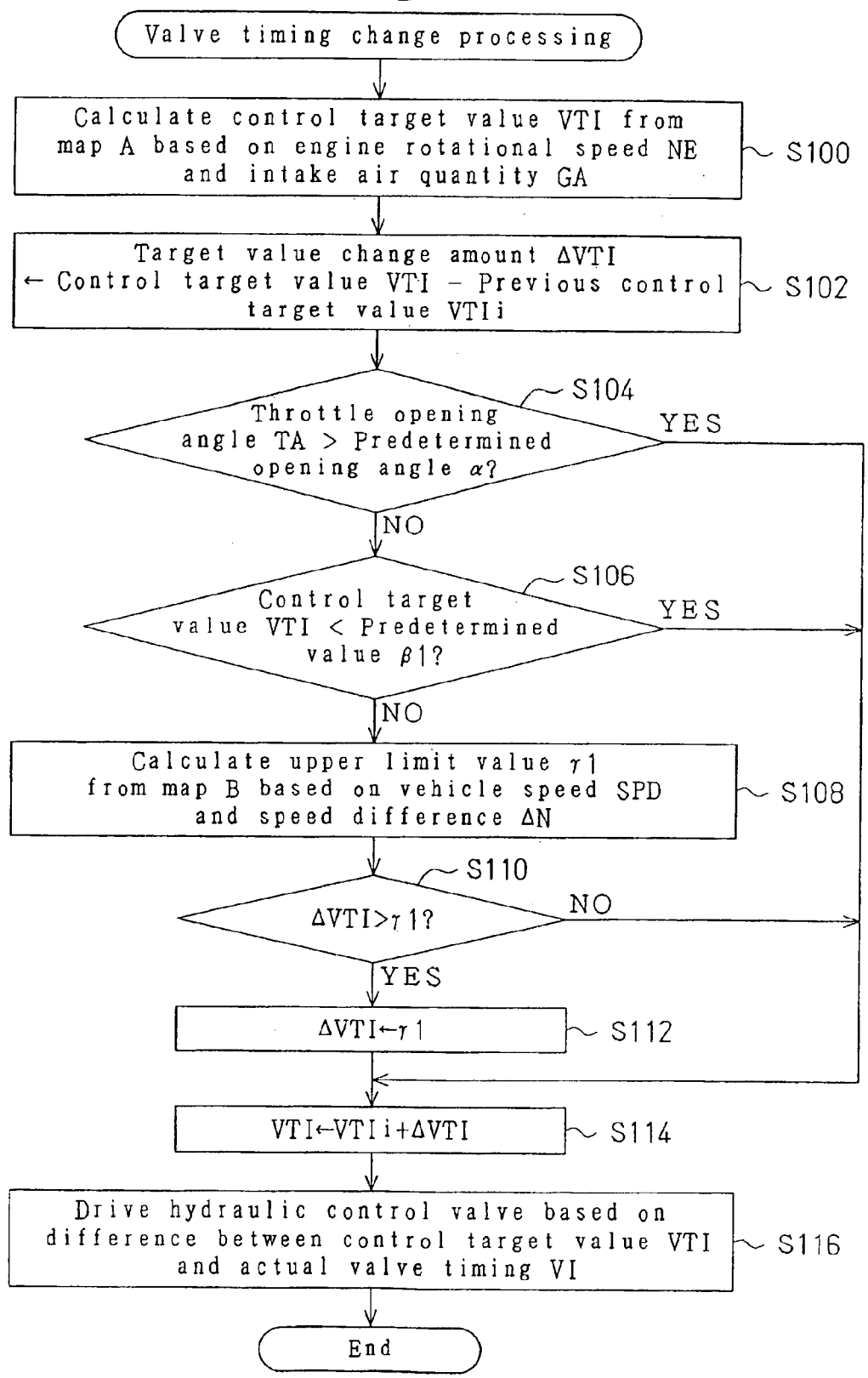

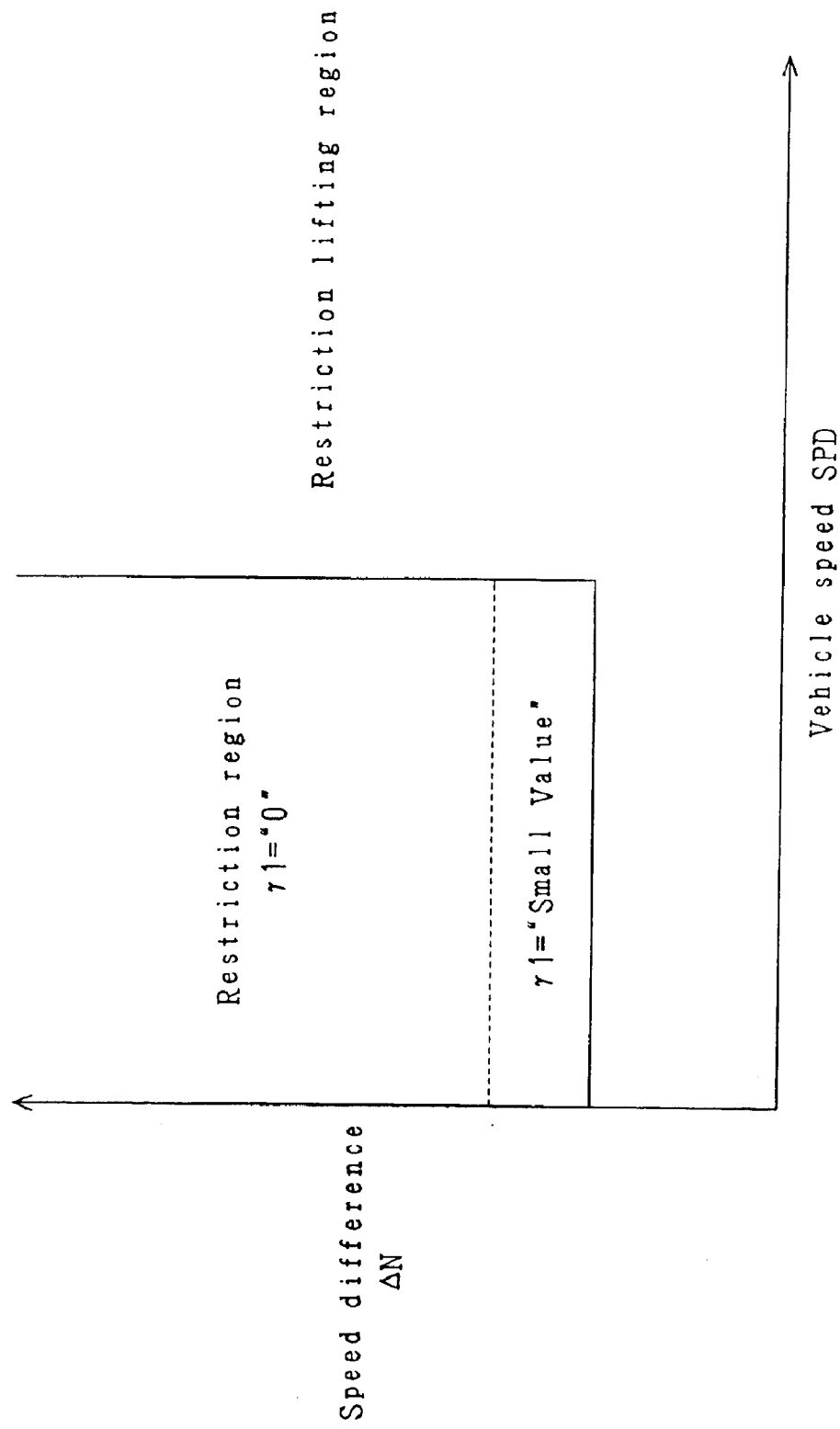

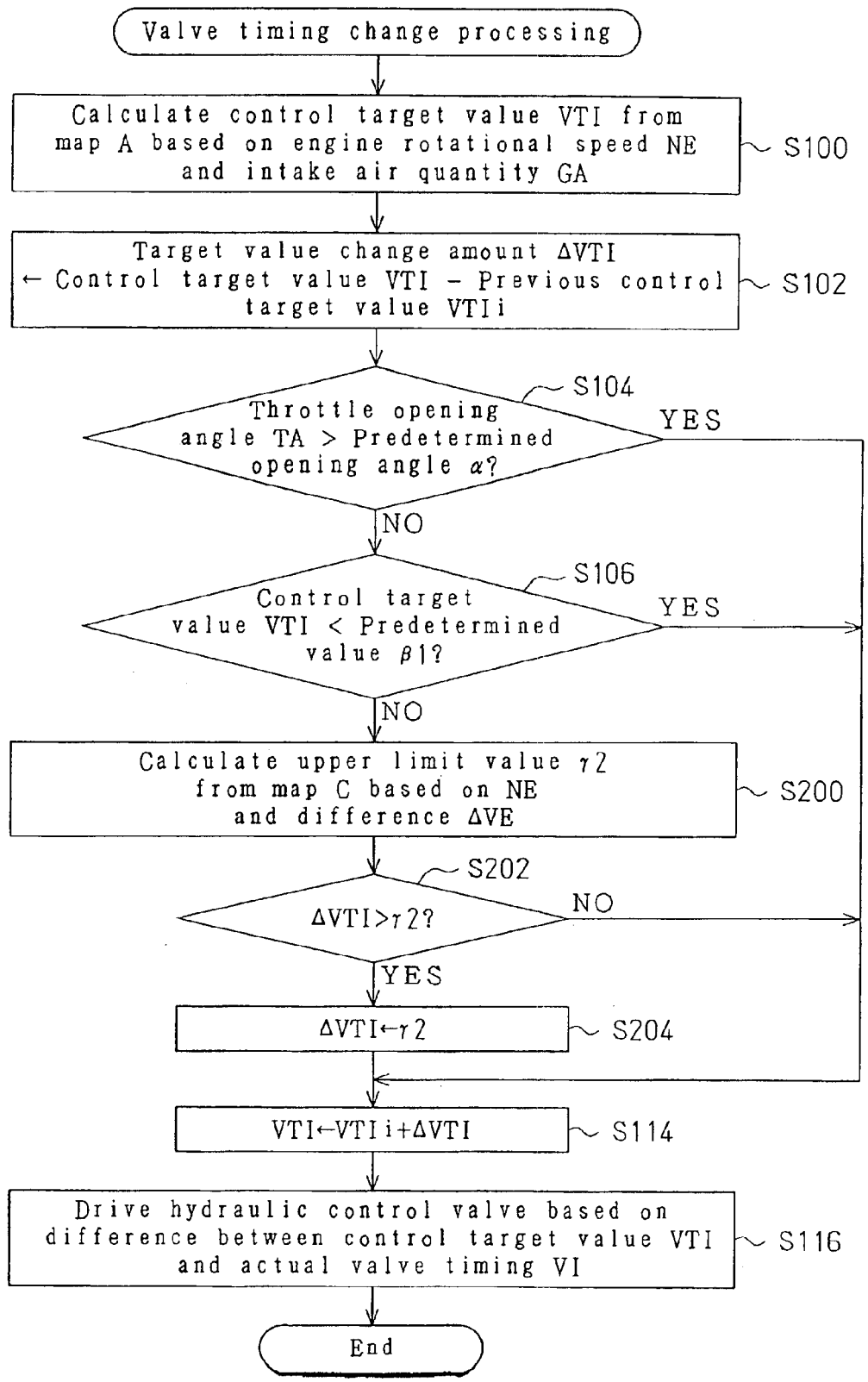

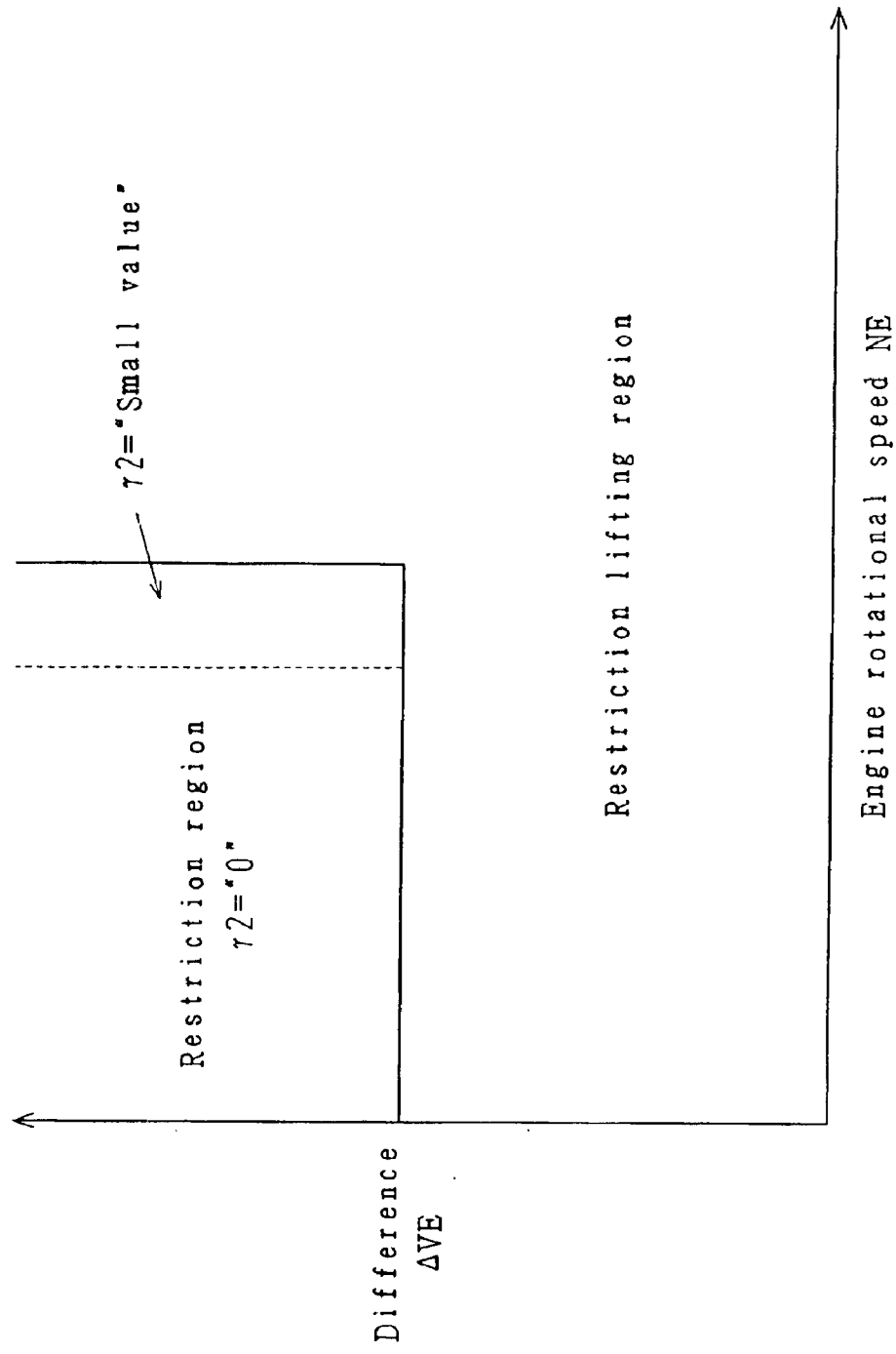

APPARATUS AND METHOD FOR CONTROLLING INTERNAL COMBUSTION ENGINE

This application claims priority to Japanese Patent Application No. 2003-317219 filed 9 Sep. 2003, the content of which is incorporated herein by reference in its entirety.

BACKGROUND OF THE INVENTION

The present invention relates to a control apparatus for an internal combustion engine, which is provided with a variable valve actuation mechanism for changing the valve properties of engine valves. The present invention also pertains to a method for controlling an internal combustion engine.

Usually, in starting a vehicle, after the rotational speed of an engine has increased to some extent, a friction clutch is engaged to start power transmission from an engine output shaft to an axle. In starting a vehicle provided with a liquid clutch such as a torque converter, likewise, power transmission to an axle is started after the rotational speed of an engine has increased to some extent. Therefore, depending on the mode of power transmission, for example, as shown in FIG. 18, when power transmission is started, that is, when a rotational speed NT of a clutch output shaft starts to increase (time t31), the increase rate of an engine rotational speed NE stagnates temporarily, or decreases temporarily in some cases.

Some internal combustion engines mounted on vehicles are provided with a variable valve actuation mechanism for appropriately changing the valve properties such as valve timing and lift of an intake valve and an exhaust valve. The variable valve actuation mechanism regulates, for example, an overlap period (valve overlap amount) of the valve opening period of the intake valve and the valve opening period of the exhaust valve, and hence executes what is called exhaust gas recirculation (internal EGR). The regulation control of valve overlap amount has often been carried out in recent years because it decreases a pumping loss and improves exhaust emission.

In this regulation control, usually, the valve overlap amount is changed so as to be increased gradually in starting the vehicle. This regulation control increases an internal EGR amount and hence deteriorates the combustion state, so that it may promote the above-described temporary stagnation of increase in engine rotational speed.

Accordingly, there has conventionally been proposed an apparatus for restricting the valve overlap amount at the time of vehicle start to an amount smaller than the amount matching the engine operating state, for example, as disclosed in Japanese Laid-Open Patent Publication No. 8-277729.

As a prior art document relating to the present invention, Japanese Laid-Open Patent Publication No. 10-318001, described below, can be cited in addition to the above-described Japanese Laid-Open Patent Publication No. 8-277729.

According to this conventional apparatus, the increase in internal EGR amount at the time of vehicle start is restrained, by which the temporary stagnation of increase in engine rotational speed can be restrained. However, even such an apparatus may have a drawback as described below.

For example, as a variable valve actuation mechanism, a variable valve timing mechanism that operates according to the pressure of supplied oil to variably set the valve timing has been known. Also, a variable valve timing mechanism provided with a lock mechanism that is operated by the pressure of supplied oil to lock the operation of variable valve timing mechanism so that the valve timing is a predetermined timing has been known.

In the variable valve timing mechanism provided with the lock mechanism, if the oil pressure is changed to change the valve timing in a locked state, first, the lock is released by the oil pressure, and then the change of valve timing is started. Therefore, if the above-described restriction of change of valve overlap amount is executed, the change of pressure of oil supplied to the lock mechanism is also restricted, which may retard or disable unlocking. This unfavorably becomes one cause for hindering a rapid change of valve overlap amount when the valve overlap amount is changed to the amount matching the engine operating state after the above-described restriction of change has been lifted.

On the other hand, an internal combustion engine provided with a variable valve actuation mechanism for each intake valve and exhaust valve has been known. In such an internal combustion engine, because of its characteristics, a difference in convergence speed of actual valve properties to desired properties arises inevitably between the variable valve actuation mechanisms when the valve properties are changed by each variable valve actuation mechanism.

When the convergence speed is changed in various modes, the change in intake air charge efficiency at the transition time when the valve properties change differs, and some change may decrease the increase rate of engine torque. This unfavorably becomes one cause for promoting the temporary stagnation of increase in engine rotational speed.

Thus, a decrease in controllability caused by vehicle acceleration cannot be avoided even by the above-described conventional apparatus, and there is yet room for improvement. The above-described drawback occurs not only at the time of vehicle start but also at the time when the vehicle is accelerated from a relatively low running speed.

SUMMARY OF THE INVENTION

An object of the present invention is to provide a control apparatus for an internal combustion engine, which is capable of restraining a decrease in follow-up performance of valve properties to desired properties while restraining temporary stagnation of increase in engine rotational speed caused by vehicle acceleration. It is also an objective of the present invention to provide a method for controlling an internal combustion engine.

To achieve the above-mentioned objective, the present invention provides a control apparatus for an internal combustion engine. The engine has an intake valve and an exhaust valve. The apparatus includes a variable valve actuation mechanism of a fluid pressure operated type. The variable valve actuation mechanism changes a valve overlap amount of the valve opening period of the intake valve and the valve opening period of the exhaust valve according to the operating state of the engine. A lock mechanism selectively switches the variable valve actuation mechanism to a locked state and an unlocked state by using fluid pressure supplied to the variable valve actuation mechanism. A controller restricts an operation amount of the variable valve actuation mechanism such that increase in the valve overlap amount is restrained when the engine is in a transient operation state in which the output of the engine increases. The controller judges whether the variable valve actuation mechanism is in the locked state. If the controller determines that the variable valve actuation mechanism is in the locked state, the controller relaxes the restriction imposed on the operation amount of the variable valve actuation mechanism.

Another aspect of the present invention is a control apparatus for an internal combustion engine. The apparatus includes an intake-side variable valve actuation mechanism that corresponds to the intake valve, and an exhaust-side variable valve actuation mechanism that corresponds to the exhaust valve. Both variable valve actuation mechanisms are fluid pressure operated type. The variable valve actuation mechanisms change a valve overlap amount of the valve opening period of the intake valve and the valve opening period of the exhaust valve according to the operating state of the engine. A controller restricts operation amounts of the variable valve actuation mechanisms such that increase in the valve overlap amount is restrained when the engine is in a transient operation state in which the output of the engine increases. The controller sets the degree of the restriction imposed on the operation amount of the intake-side variable valve actuation mechanism to be greater than the degree of the restriction imposed on the operation amount of the exhaust-side variable valve actuation mechanism.

A further aspect of the present invention is a method for controlling an internal combustion engine. The method includes changing a valve overlap amount of the valve opening period of a intake valve and the valve opening period of a exhaust valve according to the operating state of the engine by means of a variable valve actuation mechanism of a fluid pressure operated type. The variable valve actuation mechanism is selectively switching to a locked state and an unlocked state by using fluid pressure supplied to the variable valve actuation mechanism to activate a lock mechanism. An operation amount of the variable valve actuation mechanism is restricted such that increase in the valve overlap amount is restrained when the engine is in a transient operation state in which the output of the engine increases. It is judged whether the variable valve actuation mechanism is in the locked state. The restriction imposed on the operation amount of the variable valve actuation mechanism is relaxed if it is judged that the variable valve actuation mechanism is in the locked state.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a flowchart showing a procedure for valve timing change processing in accordance with the embodiment shown in FIG. 1;

FIG. 6 is a chart showing a map for calculating an upper limit value in accordance with the embodiment shown in FIG. 1;

FIG. 11 is a flowchart showing a procedure for valve timing change processing in accordance with the embodiment shown in FIG. 8;

FIG. 12 is a chart showing a map for calculating an upper limit value in accordance with the embodiment shown in FIG. 8;

DETAILED DESCRIPTION OF THE PREFERRED EMBODIMENTS

Figure 1:
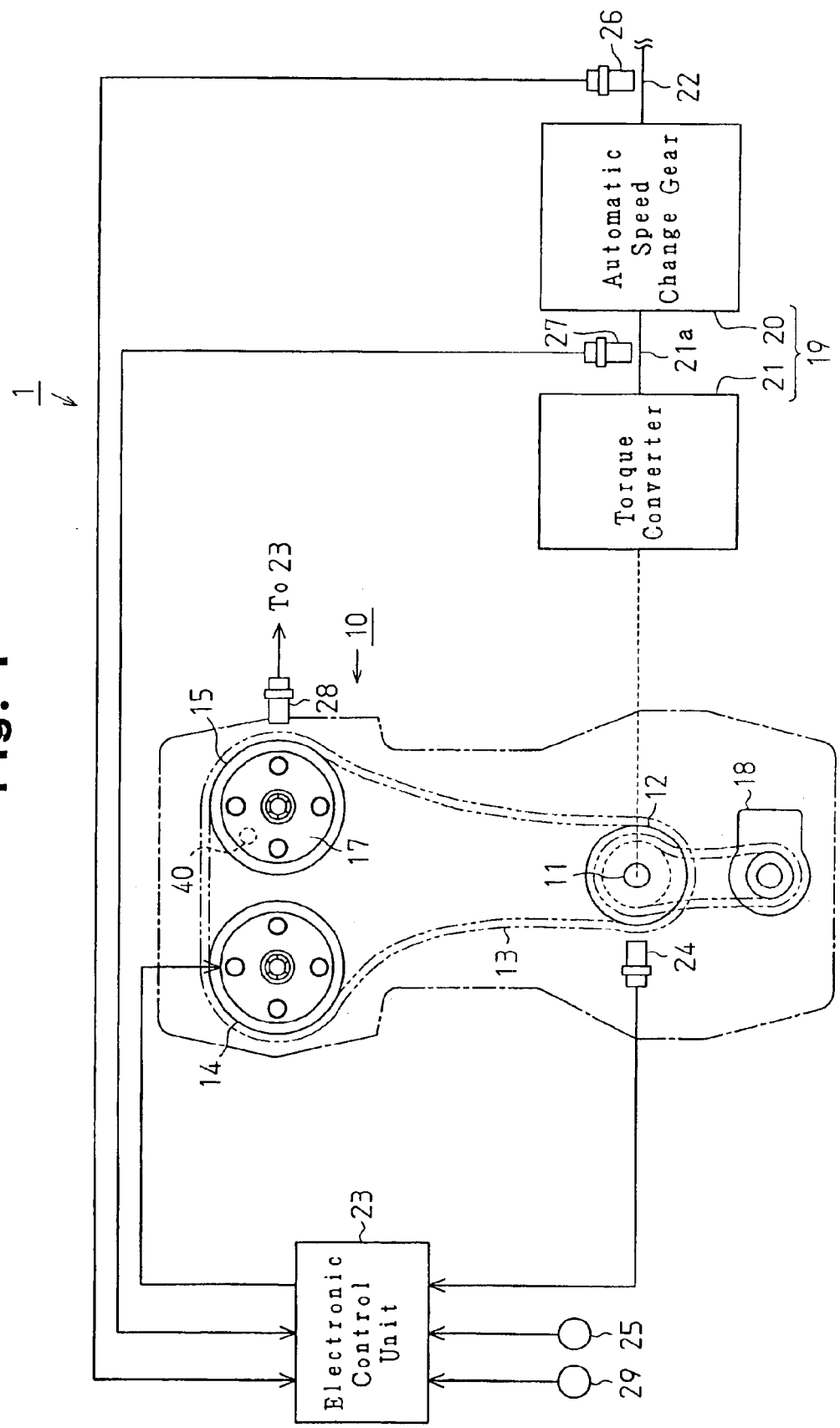
FIG. 1 is a block diagram showing a schematic configuration of a first embodiment embodying the present invention.

A first embodiment embodying the present invention will now be described. FIG. 1 shows a schematic configuration of a vehicle to which this embodiment is applied. As shown in FIG. 1, at one end of a crankshaft 11, which is an output shaft of an internal combustion engine 10 mounted on a vehicle 1, a crank pulley 12 is fixed so as to be rotatable integrally. The crank pulley 12 is connected drivingly to an exhaust-side cam pulley 14 provided at one end of an exhaust-side camshaft and an intake-side cam pulley 15 provided at one end of an intake-side camshaft via a timing belt 13. The exhaust-side cam pulley 14 is connected to the exhaust-side camshaft, and the intake-side cam pulley 15 is connected to the intake-side camshaft via a variable valve timing mechanism 17, which functions as a variable valve actuation mechanism.

The crankshaft 11 is also connected drivingly to a pump 18 via, for example, a timing belt. The crankshaft 11 is connected drivingly to an axle 22 via an automatic transmission 19. This automatic transmission 19 has an automatic speed change gear 20, which has a plurality of gear ratio positions such as first to fourth gear positions and automatically changes over the gear ratio position, and a torque converter 21, which effects power transmission between the internal combustion engine 10 and the automatic speed change gear 20 via oil. The rotation of the crankshaft 11 caused by the driving of the internal combustion engine 10 is transmitted to the axle 22 via the automatic speed change gear 20 and the torque converter 21, by which the vehicle 1 runs.

The control apparatus for controlling the internal combustion engine 10 is configured mainly by an electronic control unit 23, which functions as a controller. The electronic control unit 23 is provided with a CPU for executing various types of processing relating to the engine control, a memory for storing various kinds of information necessary for the engine control, an input port and an output port for allowing input and output of information from and to the outside.

The input port of the electronic control unit 23 is connected with various types of sensors for detecting information necessary for the engine control, such as a rotational speed sensor 24 for detecting an engine rotational speed NE and a throttle sensor 25 for detecting the opening of a throttle valve, not shown (throttle opening angle TA). As such sensors, a vehicle speed sensor 26 for detecting the running speed of the vehicle 1 (vehicle speed SPD) and a rotational speed sensor 27 for detecting a rotational speed NT of an output shaft 21a of the torque converter 21 can be cited. Besides, a position sensor 28 for detecting valve timing VI of an intake valve, and an intake air quantity sensor 29 for detecting an intake air quantity GA of the internal combustion engine 10 can be cited.

Figure 2:
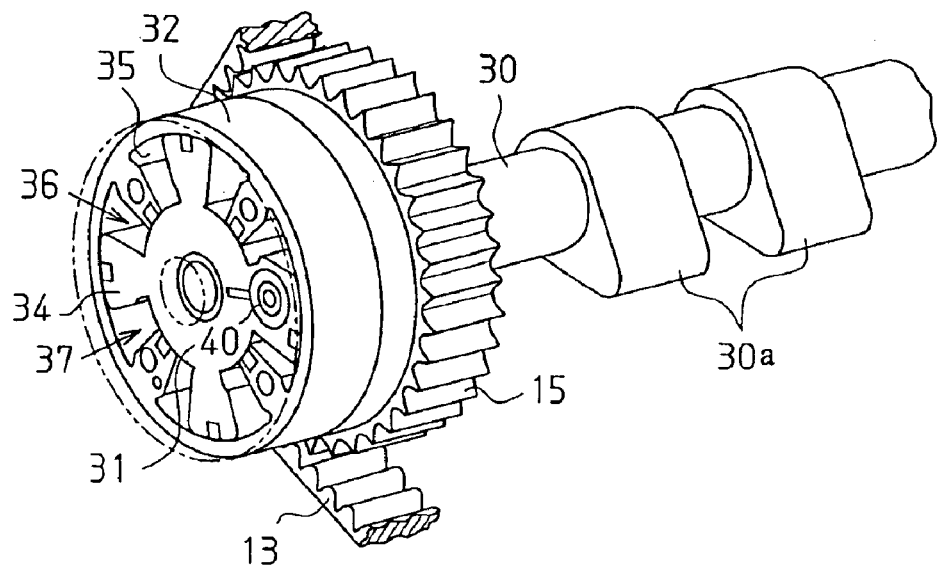
FIG. 2 is perspective sectional view of a variable valve timing mechanism in accordance with the embodiment shown in FIG. 1.

FIG. 2 shows a perspective sectional construction of the variable valve timing mechanism 17. Hereunder, the construction of the variable valve timing mechanism 17 is explained in detail with reference to FIG. 2.

As shown in FIG. 2, the variable valve timing mechanism 17 is provided at one end of the intake-side camshaft 30 on which cams 30a for opening and closing the intake valve are arranged, and broadly has a vane rotor 31 and a housing 32.

At an end of the intake-side camshaft 30 provided with the variable valve timing mechanism 17, the intake-side cam pulley 15 is provided so as to be rotatable relative to the intake-side camshaft 30. The housing 32 is fixed to the intake-side cam pulley 15 so as to be rotatable integrally.

In the housing 32, the vane rotor 31 is contained so as to be rotatable relative to the housing 32. The vane rotor 31 is fixed to the intake-side camshaft 30 so as to be rotatable integrally. At the outer periphery of the vane rotor 31, a plurality of (four, in FIG. 2) vanes 34 are formed. The vanes 34 are contained in concave portions 35 formed at the inner periphery of the housing 32, the number of the concave portions 35 being the same as the number of the vanes 34 so as to be movable in the peripheral direction of the vane rotor 31. On both sides of the vane 34 in the peripheral direction of the vane rotor 31, two oil chambers into which oil is introduced are formed so as to be defined by the outer peripheral surface of the vane rotor 31 and the inner peripheral surface of the housing 32. Of these two oil chambers, a chamber formed in the direction opposite to the rotation of the intake-side camshaft 30 with respect to the vane 34 is called a "delay angle chamber 37", and a chamber formed in the direction of rotation is called an "advance angle chamber 36".

One of the vanes 34 of the variable valve timing mechanism 17 is provided with a lock mechanism 40 that mechanically holds valve timing VI, for example, during the engine stop time when supply of pressure oil is shut off.

Figure 3A:
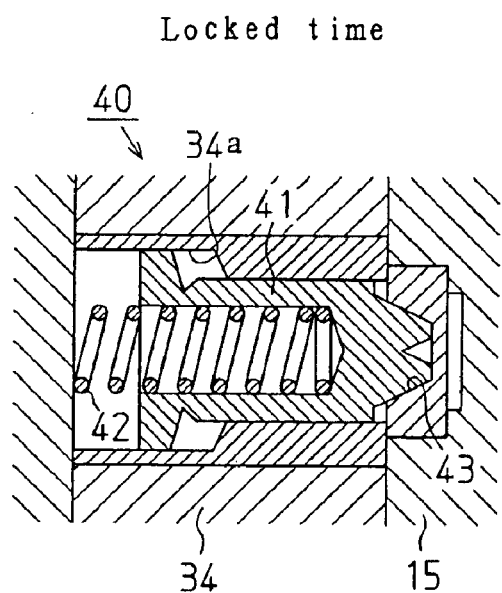
FIGS. 3(a) and 3(b) are sectional views of a lock mechanism in accordance with the embodiment shown in FIG. 1.
Figure 3B:
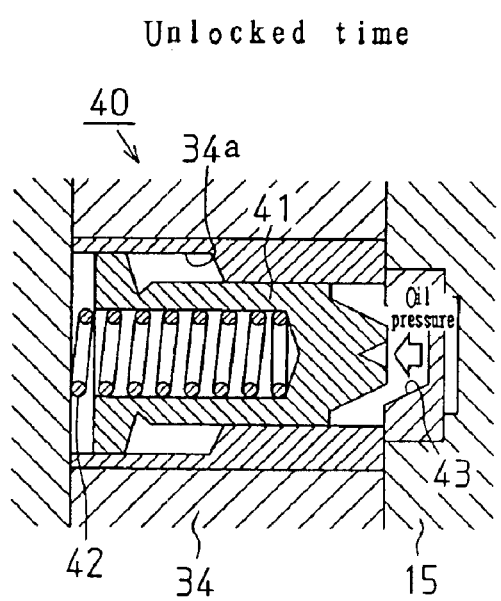

FIG. 3(a) shows a state in which locking is effected by the lock mechanism 40 so that the intake-side cam pulley 15 and the intake-side camshaft 30 rotate integrally, and FIG. 3(b) shows a state in which the lock is released.

As shown in FIG. 3, in one of the vanes 34 of the vane rotor 31, a through hole 34a extending in the direction of rotation axis of the vane rotor 31 is formed, and a lock pin 41 is provided in the through hole 34a so as to be movable reciprocatingly in the direction of its extension. A coil spring 42 is provided in the through hole 34a, and the lock pin 41 is urged toward the intake-side cam pulley 15 by the spring force of the coil spring 42.

The intake-side cam pulley 15 is formed with a lock hole 43 capable of engaging with the tip end portion of the lock pin 41. The lock hole 43 is formed so as to be at a position opposed to the tip end of the lock pin 41 when the vane rotor 31 is located at the most delayed angle position in the relative rotation range with respect to the housing 32.

The pressure oil is introduced into the through hole 34a and the lock hole 43 simultaneously with the introduction of pressure oil into the delay angle chamber 37 and the advance angle chamber 36. By the pressure of oil thus introduced, the lock pin 41 is pushed against the urging force of the coil spring 42.

If the vane rotor 31 is located at the most delayed angle position in a state in which sufficient amount of pressure oil is not introduced into the delay angle chamber 37 and the advance angle chamber 36, as shown in FIG. 3(a), the tip end portion of the lock pin 41 is fitted in and engaged with the lock hole 43 by the urging force of the coil spring 42. Thereby, the relative rotation of the vane rotor 31 and the housing 32 is regulated, and the intake-side cam pulley 15 and the intake-side camshaft 30 are formed into a locked state such as to be locked so as to be rotatable integrally. As a result, the valve timing VI is fixedly held at the most delayed angle in the variable range.

When a sufficient amount of pressure oil is introduced into at least one of the delay angle chamber 37 and the advance angle chamber 36, as shown in FIG. 3(b), the lock pin 41 is separated from the lock hole 43 by the pressure of oil. Thereby, an unlocked state in which the regulation of relative rotation of the vane rotor 31 and the housing 32 is lifted is formed, so that the operation of the variable valve timing mechanism 17, that is, the change of the valve timing VI is permitted.

Figure 4:
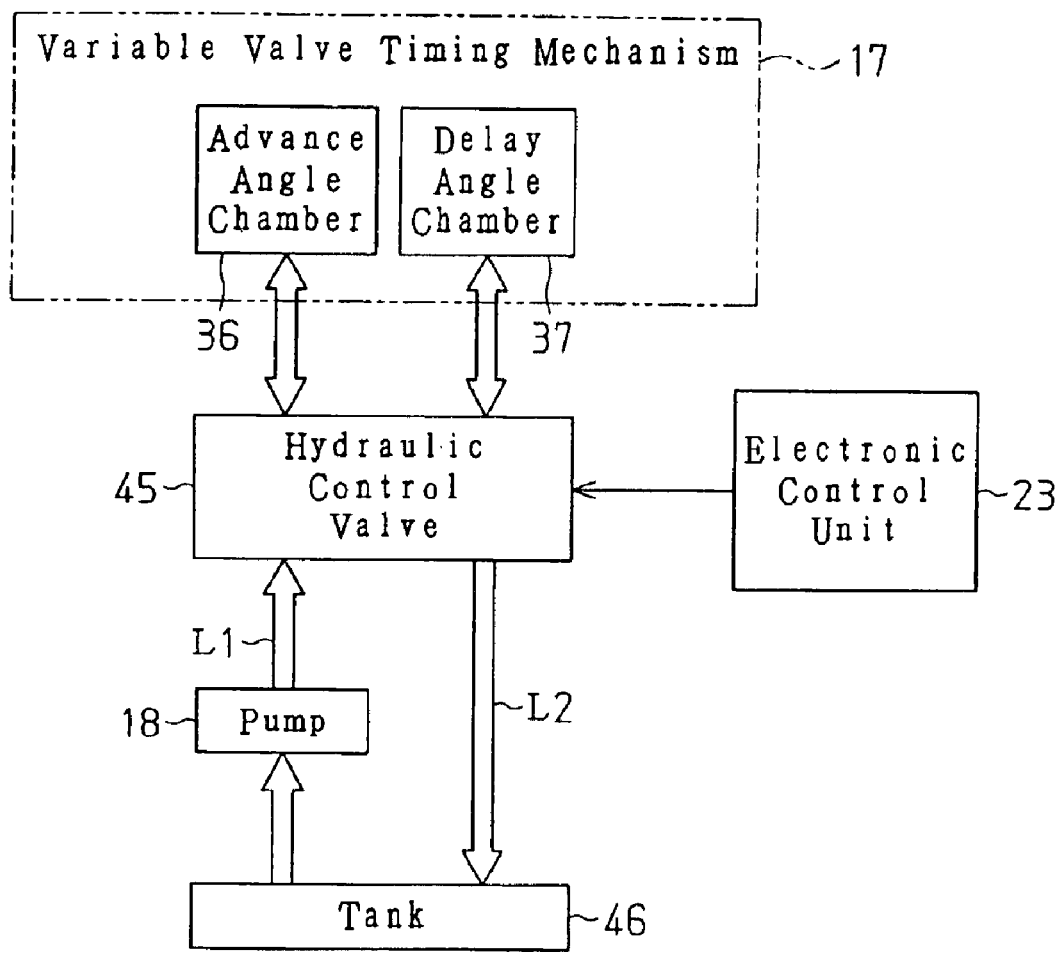
FIG. 4 is a block diagram of a hydraulic control circuit in accordance with the embodiment shown in FIG. 1.

FIG. 4 shows the configuration of a hydraulic control circuit of the variable valve timing mechanism 17. As shown in FIG. 4, the hydraulic control circuit of the variable valve timing mechanism 17 is provided with the pump 18 and a hydraulic control valve 45.

The suction side of the pump 18 is connected to a tank 46 that temporarily stores oil supplied for lubrication of the internal combustion engine 10, and the discharge side thereof is connected to a pressure oil supply path L1. The downstream side of the pressure oil supply path L1 is connected to the hydraulic control valve 45.

The hydraulic control valve 45 is connected with a drain passage L2 for recirculating oil into the tank 46, in addition to the pressure oil supply path L1. Further, the hydraulic control valve 45 is connected with the delay angle chamber 37 and the advance angle chamber 36 of the variable valve timing mechanism 17. The hydraulic control valve 45 is an electromagnetic solenoid valve whose driving operation is controlled by the electronic control unit 23, and can cause the pressure oil supply path L1 and the drain passage L2 to selectively communicate with the delay angle chamber 37 and the advance angle chamber 36.

The valve timing control of the intake valve is carried out as described below.

First, a control target value VTI of valve timing VI is set based on the engine operating state such as the engine rotational speed NE and the intake air quantity GA. The operation of the hydraulic control valve 45 is feedback controlled so that the actual valve timing VI coincides with the control target value VTI.

For example, when the valve timing VI is on the delay side of the control target value VTI, the hydraulic control valve 45 is controlled so that the advance angle chamber 36 communicates with the pressure oil supply path L1 and the delay angle chamber 37 communicates with the drain passage L2. Thereby, the oil pressure in the advance angle chamber 36 is increased, and the oil pressure in the delay angle chamber 37 is decreased. Therefore, the vane rotor 31 of the variable valve timing mechanism 17 is relatively rotated to the advance angle side with respect to the housing 32, so that the valve timing VI is changed to the advance angle side.

When the valve timing VI is on the advance angle side of the control target value VTI, the hydraulic control valve 45 is controlled so that the advance angle chamber 36 communicates with the drain passage L2 and the delay angle chamber 37 communicates with the pressure oil supply path L1. Thereby, the oil pressure in the advance angle chamber 36 is decreased, and the oil pressure in the delay angle chamber 37 is increased. Therefore, the vane rotor 31 of the variable valve timing mechanism 17 is relatively rotated to the delay side with respect to the housing 32, so that the valve timing VI is changed to the delay side.

Through the above-described feedback control, the valve timing VI of intake valve is set at an optimum timing according to the engine operating state. For example, in a medium load operation region of the internal combustion engine 10, the overlap amount of the intake and exhaust valves is increased by setting the opening timing of intake valve at an early timing, and thereby the internal EGR amount is increased, by which the exhaust performance is improved.

In the above-described lock mechanism 40, in the case where only the pressure in the delay angle chamber 37 is increased, by increasing the pressure in the delay angle chamber 37 to a value not lower than a predetermined pressure Pa, the lock pin 41 can be separated from the lock hole 43. On the other hand, in the case where the pressure in the advance angle chamber 36 is increased, by increasing the pressure in the advance angle chamber 36 to a value not lower than a predetermined pressure Pb, which is lower than the predetermined pressure Pa, the lock pin 41 can be separated. That is to say, by increasing the pressure in the advance angle chamber 36, the lock pin 41 can be separated, that is, the lock is released more quickly than the case where the pressure in the delay angle chamber 37 is increased.

In this embodiment, when the vehicle 1 is stopped and the internal combustion engine 10 is in an idling state, the variable valve timing mechanism 17 is in a locked state. That is to say, a state in which the relative rotation of the vane rotor 31 and the housing 32 is locked at the most delayed angle position is formed.

When the control target value VTI is changed to a value on the advance angle side at the time of vehicle start and the pressure in the advance angle chamber 36 is increased, the lock pin 41 of the lock mechanism 40 is thereby separated from the lock hole 43, and the lock is released, so that the relative rotation of the vane rotor 31 with respect to the housing 32 is permitted. After the lock is released in this manner, the change of valve timing VI to the advance angle side is started.

In this embodiment, in order to restrain the above-described temporary stagnation of increase in engine rotational speed NE, when the internal combustion engine 10 is in a transient operation state in which the output increases, concretely when the vehicle 1 is accelerated, the change of valve timing VI to the side (advance angle side) on which the valve overlap amount increases is restrained. In executing the change restriction, it is judged whether or not the lock mechanism 40 is in a locked state, and if it is judged that it is in a locked state, the restriction is not carried out.

Hereunder, the procedure for valve timing change processing including the processing for the above-described change restriction is explained.

FIG. 5 is a flowchart showing a concrete procedure for valve timing change processing. A series of processing shown in this flowchart is executed by the electronic control unit 23 as processing for each predetermined cycle. In this processing, it is assumed that the control target value VTI increases toward the advance angle side.

As shown in FIG. 5, in this processing, first, the control target value VTI is calculated from map A based on the engine rotational speed NE and intake air quantity GA (Step S100).

Next, a target value change amount ΔVTI is calculated from an equation "ΔVTI←VTI−VTIi" based on the control target value VTI calculated this time and the control target value VTIi calculated previously (Step S102).

Next, it is judged whether or not the throttle opening angle TA is larger than a predetermined opening angle α (Step S104). If the throttle opening angle TA is larger than the predetermined opening angle α, it is judged that the throttle valve is opened close to full open, and the vehicle 1 is accelerated substantially at full throttle.

If the throttle opening angle TA is not larger than the predetermined opening angle α (Step S104: NO), it is judged whether or not the control target value VTI is smaller than a predetermined value β1 (Step S106). As the predetermined value β1, a value corresponding to valve timing at which the locked state of the lock mechanism 40 is transferred to the unlocked state while the change of valve timing VI from the most delayed angle position is restrained so as to be as small as possible, and the unlocked state can be maintained has been determined based on experiments and set. Therefore, it is judged that the variable valve timing mechanism 17 is in a locked state, or that the control target value VTI is not a value at which the locked state can be transferred to the unlocked state. In this embodiment, the processing in Step S106 functions as judging means for judging that the variable valve actuation mechanism is in a locked state.

If the control target value VTI is not smaller than the predetermined value β1 (Step S106: NO), a speed difference between the rotational speed NT of the output shaft 21a of the torque converter 21 and the engine rotational speed NE, i.e., a speed difference AN (=NE NT) between the input and output shafts of the torque converter 21 is calculated. Based on the speed difference AN and the vehicle speed SPD, an upper limit value γ1 of the change amount of the control target value VTI is calculated from map B (FIG. 6) (Step S108). Then, it is judged whether or not the target value change amount ΔVTI is larger than the upper limit value γ1 (Step S110).

If the target value change amount ΔVTI is larger than the upper limit value γ1 (Step S110: YES), the upper limit value γ1 is set as the target value change amount ΔVTI (Step S112). If the target value change amount ΔVTI is not larger than the upper limit value γ1 (Step S110: NO), the target value change amount ΔVTI is not changed. Thus, the upper limit guard processing for the target value change amount ΔVTI is executed based on the upper limit value γ1. In this embodiment, this upper limit guard processing functions as restricting means for restricting the operation amount of the variable valve actuation mechanism so that the increase in valve overlap amount is restrained in the transient operation state in which the output of the internal combustion engine 10 increases.

The upper limit value γ1 is set as a value at which the temporary stagnation of increase in the engine rotational speed NE may occur when the change amount of the control target value VTI, i.e., the target value change amount ΔVTI becomes larger than the upper limit value γ1. The upper limit value γ1 is set from the viewpoint as described below.

At the time of start or acceleration of the vehicle 1, after the engine rotational speed NE has increased to some extent, the torque transmitted by the torque converter 21 begins to increase, thereby the vehicle 1 is accelerated. The increase amount of the transmitted torque increases as the speed difference AN increases. Therefore, it can be said that as the speed difference AN increases, a shortage of engine torque is liable to occur, so that the above-described temporary stagnation of increase in the engine rotational speed NE is liable to occur.

When the vehicle speed SPD is low, the first gear position is selected as the gear ratio position of the automatic speed change gear 20. In other words, the gear ratio of the automatic speed change gear 20 is highest. In this time, fluctuations in engine torque are easily transmitted to the axle 22, so that if the above-described "stagnation" occurs, instability of vehicle behavior caused by this stagnation appears remarkably, by which the drivability is decreased greatly.

When the speed difference AN is large and the vehicle speed SPD is low, the possibility of decreased drivability is high. Therefore, as shown in the map B in FIG. 6, in this case, a small value is calculated as the upper limit value γ1. In this operation region (restriction region), basically, "0" is calculated as the upper limit value γ1, by which the change of valve timing VI is prohibited. However, in the region in which the speed difference AN is comparatively small, a small value is set as the upper limit value γ1, by which some change of valve timing VI is permitted. On the other hand, in an operation region in which the speed difference AN is sufficiently small or an operation region in which the vehicle speed SPD is sufficiently high (restriction lifting region), a sufficiently large value is calculated as the upper limit value γ1, by which the change of valve timing VI is not restricted.

Thus, in this processing, the change amount of the operation amount of the variable valve timing mechanism 17 is decreased through the upper limit guard processing at the time of, vehicle acceleration though inherently the control target value VTI is changed by the target value change amount ΔVTI calculated in Step S102 to change the operation amount of the variable valve timing mechanism 17.

In the aforementioned map B, the relationship between the upper limit value γ1 satisfying the above-described requirements, the speed difference AN, and the vehicle speed SPD is determined by experiments, and stored in the electronic control unit 23.

After the upper limit guard processing has been executed, the control target value VTI is updated through Equation (1) based on the target value change amount ΔVTI and the control target value VTIi calculated previously (Step S114).

$$VTI \leftarrow VTIi + \Delta VTI \qquad (1)$$

Subsequently, after the driving of the hydraulic control valve 45 is controlled according to a difference between the control target value VTI and the actual valve timing VI (Step S116), this processing is once finished.

If the throttle opening angle TA is larger than the predetermined opening angle α (Step S104: YES), that is, when the vehicle 1 is accelerated at full throttle, the upper limit guard processing (Steps S108 through S112) is jumped. The control target value VTI is updated through Equation (1) (Step S114), and after the driving of the hydraulic control valve 45 is controlled based on the control target value VTI (Step S116), this processing is once finished.

When the vehicle 1 is accelerated at full throttle, the engine rotational speed NE increases suddenly, so that the transmitted torque begins to increase in a state in which the engine rotational speed NE becomes sufficiently high. Therefore, though the speed difference AN increases, the temporary stagnation of increase in engine rotational speed NE does not occur. In this processing, since the change restriction of valve timing VI is not imposed in such a case, the valve timing VI is changed quickly.

If the control target value VTI is smaller than the predetermined value β1 (Step S106: YES), it is judged that the variable valve timing mechanism 17 is in a locked state, and in this case as well, the upper limit guard processing is jumped. Thereby, during the period until the control target value VTI becomes the predetermined value β1, that is, during the period until the control target value VTI becomes a value capable of making the variable valve timing mechanism 17 in an unlocked state, the change restriction of valve timing VI is lifted compulsorily. In this embodiment, the processing in Step S106 functions as relaxing means for relaxing the restriction imposed on the increase in valve overlap amount when it is judged that the variable valve actuation mechanism is in a locked state.

Hereunder, the operation caused by the execution of such valve timing change processing is explained.

FIGS. 7(a)–(d) show one example of processing mode of valve timing change processing. When an accelerator pedal is depressed to start the vehicle 1 (time t11), the engine rotational speed NE increases thereafter (FIG. 7(a)), and accordingly the speed difference ΔN increases (FIG. 7(b)).

Figure 7A:
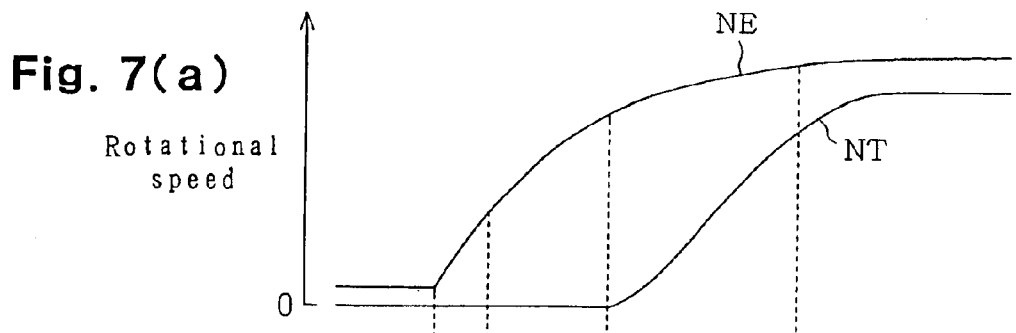
FIGS. 7(a) to 7(d) are timing charts showing one example of mode of valve timing change processing in accordance with the embodiment shown in FIG. 1.
Figure 7B:
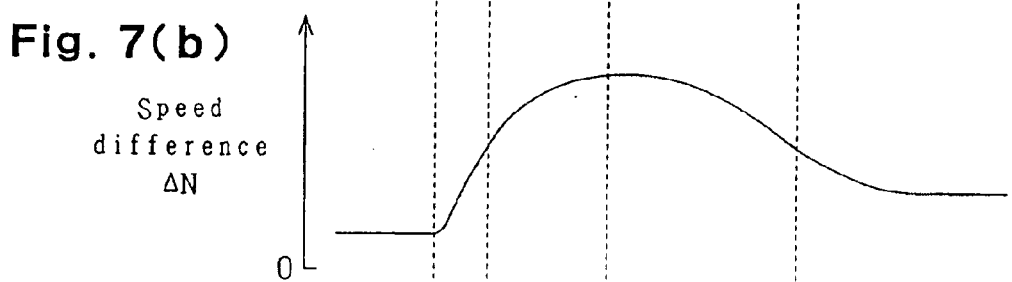
Figure 7C:
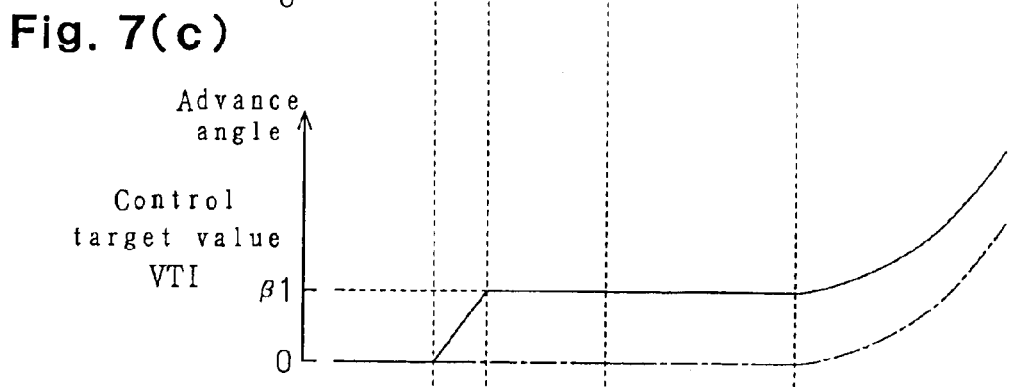
Figure 7D:
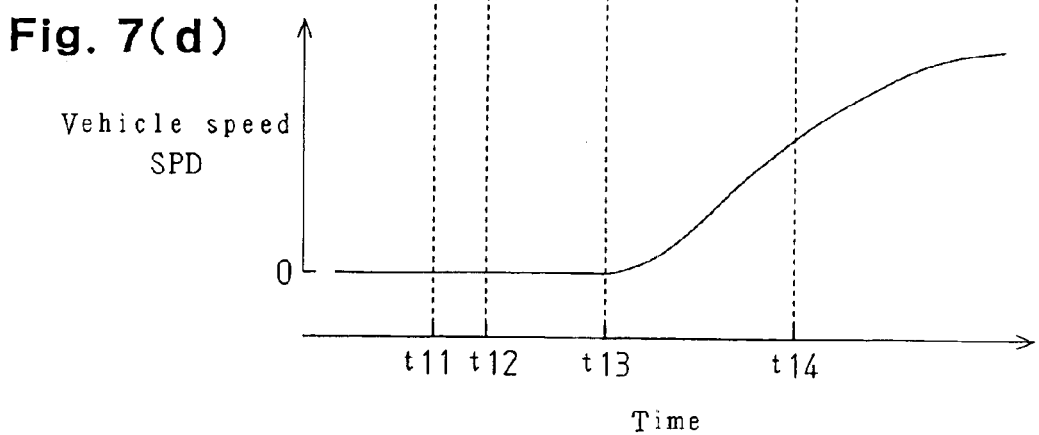

During the period (time t11 through t12) until the control target value VTI (FIG. 7(c)) becomes not smaller than the predetermined value β1, the update of the control target valve VTI is not restricted, so that the control target value VTI is updated to a value on the advance angle side quickly as compared with the conventional apparatus in which the update is prohibited as indicated by the dash-and-dot line in FIG. 7(c). Thereby, the lock by the lock mechanism 40 is released quickly.

When the control target value VTI becomes not smaller than the predetermined value p1 (time t12), the change restriction of control target value VTI is started. In this example, in this case, the speed difference AN is large, and the vehicle speed SPD (FIG. 7(d)) is low, so that the update of control target value VTI is prohibited.

Thereby, when the rotational speed NT of the output shaft 21a of the torque converter 21 begins to increase (time t13), and immediately after that time, the increase in valve overlap amount is avoided, and hence the temporary stagnation of increase in engine rotational speed NE caused by this increase is restrained.

Subsequently, when the speed difference AN decreases and the vehicle speed SPD increases (time t14), the update prohibition of control target value VTI is removed accordingly, and hence the change of valve timing VI is started. Thereby, some change of control target value VTI is first permitted, and then the change restriction is lifted, thus the control target value VTI being changed, so that the valve timing VI is changed to a predetermined timing matching the engine operating state.

According to this embodiment, an advantage as described below can be offered.

(1) The temporary stagnation of increase in engine rotational speed NE can be restrained through the change restriction of valve timing VI at the time of vehicle acceleration. Moreover, since the change restriction is lifted compulsorily when the locked state by the lock mechanism 40 is formed at the time of restriction start, a delay in operation of the lock mechanism 40 is avoided to the utmost, and the lock can be released quickly. Thereby, the valve timing VI can be changed quickly after the change restriction has been lifted. Therefore, a decrease in follow-up performance of the valve timing VI to a desired valve timing can be restrained while the temporary stagnation of increase in engine rotational speed caused by the vehicle acceleration is restrained.

Figure 8:
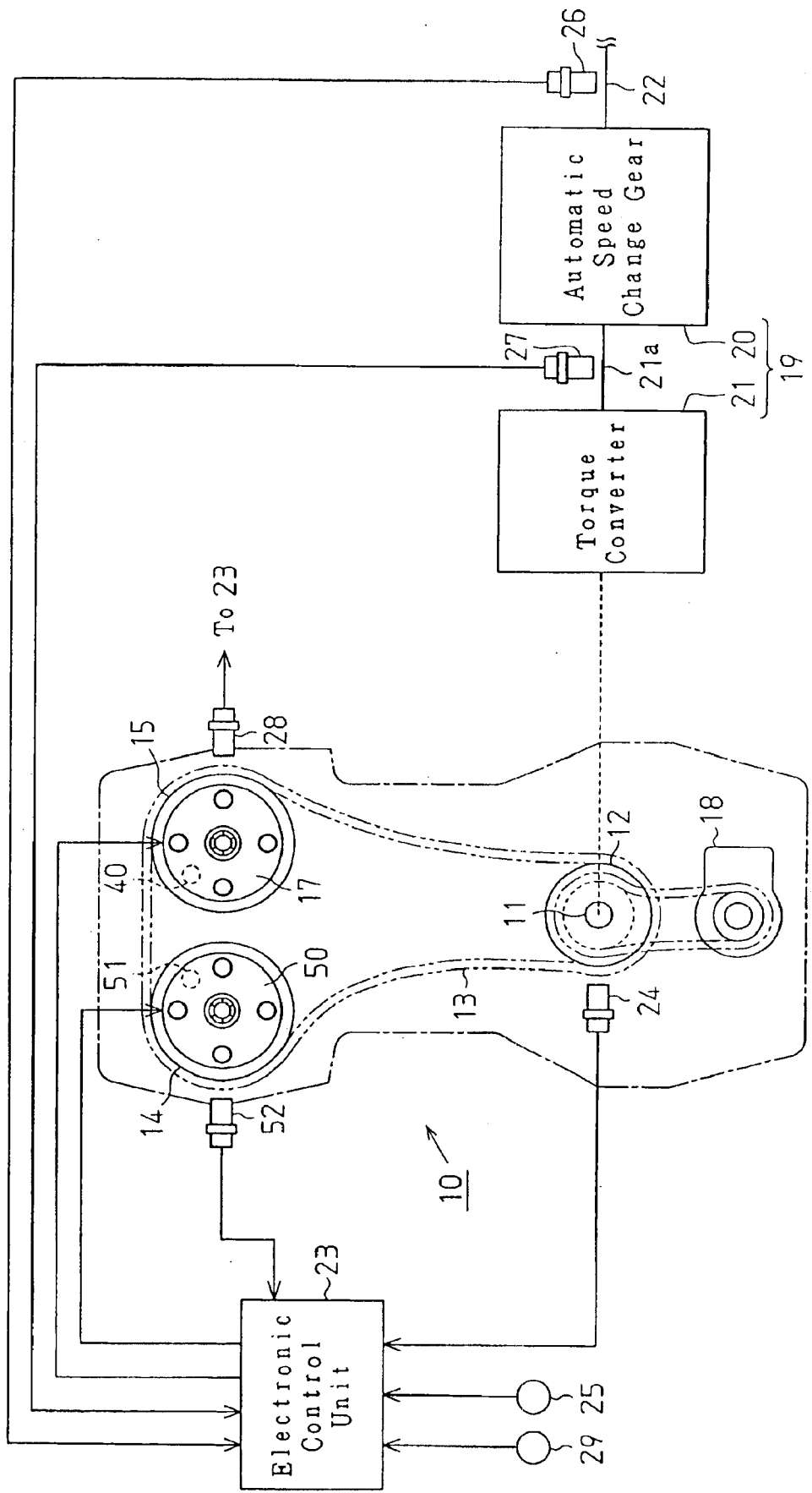
FIG. 8 is a block diagram showing a schematic configuration of a second embodiment embodying the present invention.

Next, a second embodiment embodying the present invention will be described. Hereunder, points different from the above-described first embodiment are mainly explained. As shown in FIG. 8, the internal combustion engine 10 in accordance with this embodiment is provided with a variable valve timing mechanism 50 on the exhaust side, too, in addition to the variable valve timing mechanism 17 on the intake side. This variable valve timing mechanism 50 on the exhaust side is also provided with a lock mechanism 51 for fixedly holding the valve timing. Further, a position sensor 52 for detecting valve timing VE of the exhaust valve is provided.

The configurations of the variable valve timing mechanism 50 and the lock mechanism 51 on the exhaust side are almost common with those of the variable valve timing mechanism 17 and the lock mechanism 40 on the intake side. In the variable valve timing mechanism 50 on the exhaust side, however, the relative rotation is regulated by the lock mechanism 51 at the most advanced angle position in the relative rotation range of the vane rotor 31 with respect to the housing 32. The valve timing of exhaust valve in this case, which is set at the most advanced angle, is an optimum timing for improving the startability.

Figure 9:
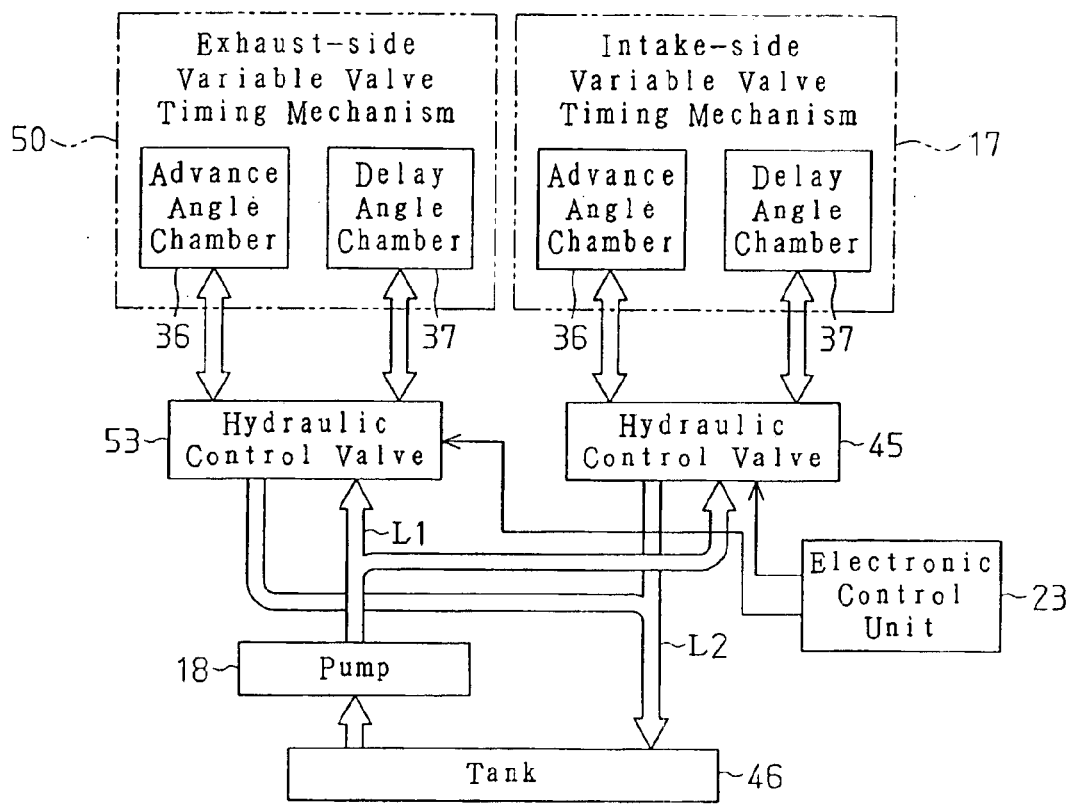
FIG. 9 is a block diagram of a hydraulic control circuit in accordance with the embodiment shown in FIG. 8.

FIG. 9 shows the configuration of a hydraulic control circuit in accordance with this embodiment. As shown in FIG. 9, the hydraulic control circuit is provided with a hydraulic control valve 53 for regulating the pressure of oil supplied to the variable valve timing mechanism 50 on the exhaust side in addition to the hydraulic control valve 45 for regulating the pressure of oil supplied to the variable valve timing mechanism 17 on the intake side.

This hydraulic control valve 53 is connected with branch lines of the pressure oil supply path L1 and the drain passage L2, which are connected to the hydraulic control valve 45. The hydraulic control valve 53 is connected with the delay angle chamber 37 and the advance angle chamber 36 of the variable valve timing mechanism 50 on the exhaust side. Like the hydraulic control valve 45, the hydraulic control valve 53 is an electromagnetic solenoid valve whose driving operation is controlled by the electronic control unit 23, and can cause the pressure oil supply path L1 and the drain passage L2 to selectively communicate with the delay angle chamber 37 and the advance angle chamber 36 of the variable valve timing mechanism 50 on the exhaust side.

The operation of the hydraulic control valve 53 is feedback controlled, and the valve timing VE of exhaust valve is set variably. Specifically, a control target value VTE of valve timing VE of the exhaust valve is set based on engine operating state such as the engine rotational speed NE and the intake air quantity GA, and the operation of the hydraulic control valve 53 is feedback controlled so that the valve timing VE coincides with the control target value VTE. Through this feedback control, the valve timing VE is set at an optimum timing according to the engine operating state. The control target value VTE of the exhaust valve is set so that an optimum valve overlap amount is secured according to the engine operating state with the change of valve timing VI of the intake valve.

In the internal combustion engine 10 in accordance with this embodiment, it was confirmed by the inventors that when the valve timing of each valve is changed so as to match the engine operating state at the time of vehicle acceleration, the intake air charge efficiency is changed by a convergence speed difference at the time when each valve timing converges at a target timing as described below.

Figure 10:
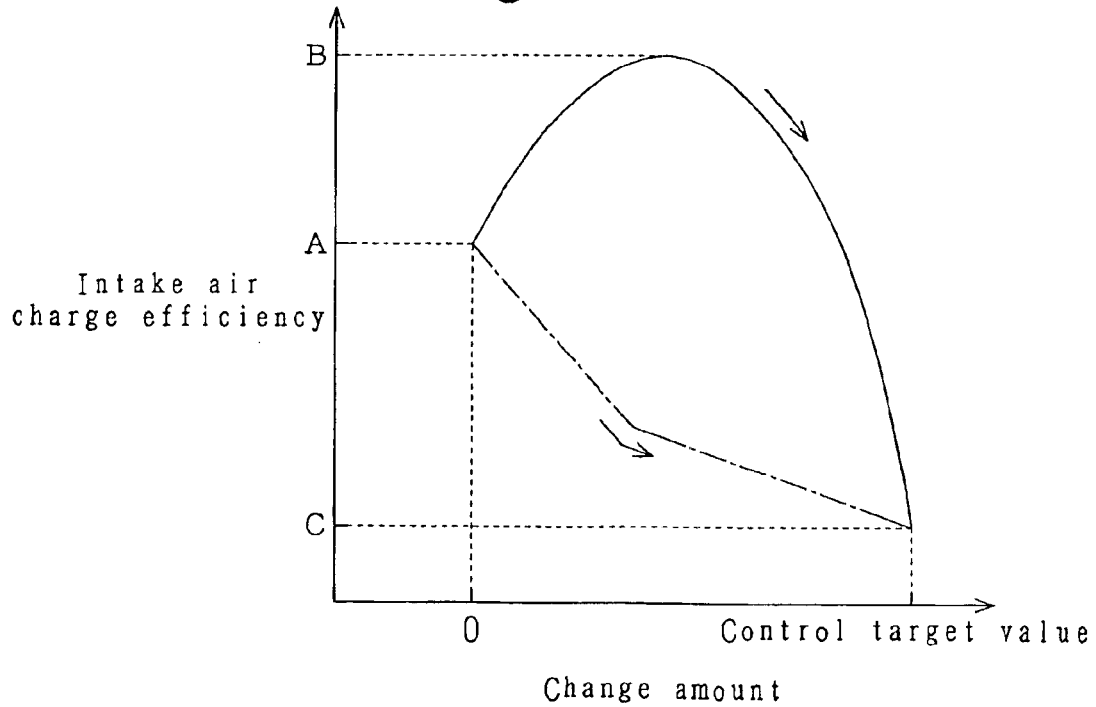
FIG. 10 is a graph showing the relationship between change mode of each valve timing and change in intake air charge efficiency of the mode shown in FIG. 8.

When the valve timing VE of the exhaust valve is changed after the valve timing VI of the intake valve has been changed, as indicated by the solid line in FIG. 10, the intake air charge efficiency once increases from the initial value A to a value B, and then decreases greatly to a value C. Inversely, when the valve timing VI of the intake valve is changed after the valve timing VE of the exhaust valve has been changed, as indicated by the dash-and-dot line in FIG. 10, the intake air charge efficiency decreases gradually without the temporary rise.

When the valve timing VI of the intake valve is first changed, a drop width of the intake air charge efficiency from the maximum value (value B) to the minimum value (value C) at the transient time increases. In this case, as compared with the case where the valve timing VE of the exhaust valve is first changed, the maximum decrease rate of engine torque at the time of change transition of each valve timing increases, so that the increase rate of engine torque slows down temporarily, and hence the above-described temporary stagnation of increase in engine rotational speed NE is liable to occur.

In this embodiment, when each valve timing is changed at the time of vehicle acceleration, the change of valve timing VI of the intake valve is prohibited until the valve timing VE of the exhaust valve approaches the control target valve VTE, by which the change start of valve timing VI of the intake valve is delayed by a predetermined period as compared with the change start of valve timing VE of the exhaust valve.

Hereunder, the procedure for valve timing change processing in accordance with this embodiment is explained with reference to the flowchart shown in FIG. 11.

This flowchart shows a series of processing for the procedure at the time when the valve timing VI of intake valve is changed. In this processing, the processing in Steps S200 through S204 is executed in place of the processing in Steps S108 through S112 in the valve timing change processing in the first embodiment. In the second embodiment, the processing in Steps S200 through S204 functions as restricting means for restricting the operation amount of the variable valve actuation mechanism so that the increase in valve overlap amount is restrained when the internal combustion engine 10 is in a transient operation state in which the output thereof increases.

First, in Step S200, a difference $\Delta VE$ (=VTE−VE) between the control target valve VTE of the valve timing VE of exhaust valve and the valve timing VE thereof is calculated, and an upper limit value $\gamma 2$ is calculated from map C (FIG. 12) based on the difference $\Delta VE$ and the engine rotational speed NE.

Next, it is judged whether or not the target value change amount ΔVTI is larger than the upper limit value γ2 (Step S202). If the target value change amount ΔVTI is larger than the upper limit value γ2. (Step S202: YES), the upper limit value γ2 is set as the target value change amount ΔVTI, (Step S204). If the target value change amount ΔVTI is not larger than the upper limit value γ2 (Step S202: NO), the target value change amount ΔVTI is not changed. By this way, the upper limit guard processing is executed.

The upper limit value γ2 is set as a value such that when the change amount of control target value VTI, i.e., the target value change amount ΔVTI becomes larger than the upper limit value γ2, the temporary stagnation of increase in engine rotational speed NE may occur, and is calculated from the viewpoint described below.

The above-described "stagnation" is liable to occur at the time of vehicle start or at the acceleration time when the vehicle speed SPD increases from a very low speed. The maximum speed that the engine rotational speed NE can take in such a situation can be determined by experiments. Therefore by restricting the change of valve timing VI in a speed region not higher than the maximum speed, the occurrence of the "stagnation" can be restrained appropriately. On the other hand, even if the change of valve timing VI is started after the difference ΔVE has become sufficiently small, the above-described temporary rise in intake air charge efficiency does not occur.

Based on these situations, as shown in map C in FIG. 12, when the engine rotational speed NE is low and the difference ΔVE is large, a small value is calculated as the upper limit value γ2. In this operation region (restriction region), basically, "0" is calculated as the upper limit value γ2, and the change of valve timing VI is prohibited. In a region in which the engine rotational speed NE is comparatively high, however, the possibility of occurrence of the above-described "stagnation" becomes low, so that a small value is set as the upper limit value γ2, and some change of valve timing VI is permitted. On the other hand, in a operation region in which the engine rotational speed NE is high, or in the operation region in which the difference ΔVE is small (restriction lifting region), a sufficiently large value is calculated as the upper limit value γ2, and the change of valve timing VI is not restricted.

Thus, in this processing, the change amount of the operation amount of the variable valve timing mechanism 17 is decreased through the upper limit guard processing at the time of vehicle acceleration though inherently the control target value VTI is changed by the target value change amount ΔVTI calculated in Step S102 to change the operation amount of the variable valve timing mechanism 17.

In the aforementioned map C, the relationship between the upper limit value γ2 satisfying the above-described requirements, the engine rotational speed NE, and the difference ΔVE is determined by experiments, and stored in the electronic control unit 23.

Hereunder, the operation caused by the execution of such valve timing change processing is explained.

Figure 13A:
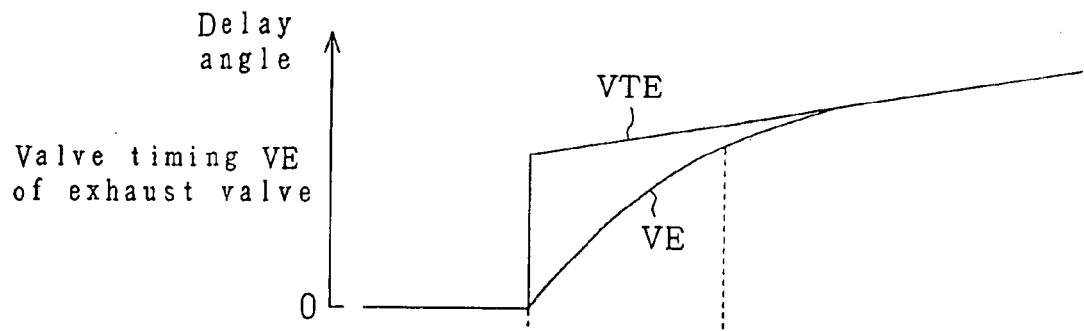
FIGS. 13(a) to 13(c) are timing charts showing one example of mode of valve timing change processing in accordance with the embodiment shown in FIG. 8.
Figure 13B:
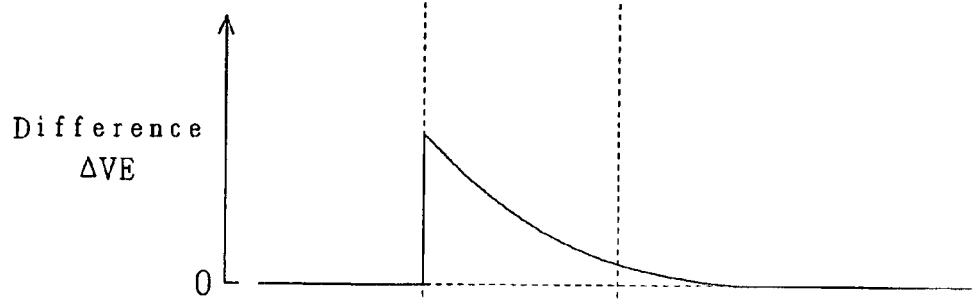
Figure 13C:
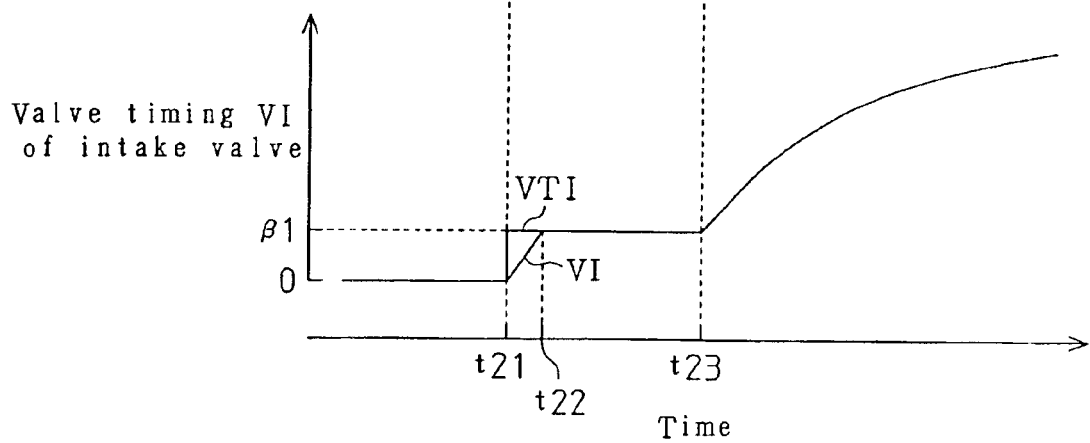

FIGS. 13(a)–(c) show one example of processing mode of valve timing change processing. When an accelerator pedal is operated (time t21), the throttle opening angle TA becomes large and the intake air quantity GA increases. Accordingly, the control target value VTE of the valve timing VE (FIG. 13(a)) of exhaust valve becomes a value on the delay angle side. Subsequently, the operation of the hydraulic control valve 53 is controlled based on a difference between the control target value VTE and the valve timing VE, and the valve timing VE is changed to a value on the delay angle side.

On the other hand, during the period until the control target value VTI of the valve timing VI of intake valve becomes the predetermined value β1 (time t21 through t22), the update of the control target value VTI thereof is not restricted. Therefore, the control target value VTI is quickly updated to the predetermined value β1 during this period, and the lock by the lock mechanism 51 is released quickly.

When the control target value VTI becomes the predetermined value β1 (time t22), the update restriction of control target value VTI is started. In this example, in this case, the difference ΔVE (FIG. 13(b)) between the control target value VTE and the valve timing VE is large, so that the change of control target value VTI is prohibited. Subsequently, when the difference ΔVE becomes sufficiently small (time t23), the update of control target value VTI is started, and the change of valve timing VI is started.

As described above, in this embodiment, when the change of each valve timing VI, VE is restricted, the change of valve timing VE of the exhaust valve is first started, and after the difference ΔVE with the control target value VTE has become sufficiently small, the change of valve timing VI of the intake valve is started. That is to say, the change restriction of the operation amount of each of the variable valve timing mechanisms 17 and 50 is effected to decrease the maximum decrease rate of engine torque so that the change of valve timing VE of the exhaust valve is not restricted, and only the change of valve timing VI of the intake valve is restricted. Thereby, the slowdown of increase rate of the engine torque caused by the convergence speed difference is restrained at the time of vehicle acceleration.

If the operations of the variable valve timing mechanisms 17 and 50 are started at the same time when the change of each valve timing VI, VE is restricted, the quantity of oil supplied to the variable valve timing mechanisms 17 and 50 becomes insufficient temporarily, so that the convergence speed sometimes decreases unnecessarily. According to this embodiment, since the operation of the variable valve timing mechanism 50 on the exhaust side is started prior to the operation start of the variable valve timing mechanism 17 on the intake side, the necessary oil quantity can be decreased accordingly, and hence an unnecessary decrease in the convergence speed can be restrained.

As described above, this embodiment provides advantages as described below in addition to the advantage of the first embodiment.

(2) At the time of vehicle acceleration, the temporary slowdown of increase rate of the engine torque caused by the convergence speed difference can be restrained, and thus the temporary stagnation of increase in engine rotational speed NE can be restrained properly.

(3) Since the change of valve timing VE of the exhaust valve is not restricted, and only the change of valve timing VI of the intake valve is restricted, the temporary stagnation of increase in engine rotational speed NE can be restrained more properly.

(4) Since the change of valve timing VE of the exhaust valve is not restricted, the valve timing VE can be changed quickly to the timing matching the engine operating state. Therefore, a decrease in follow-up performance of the valve timing to a desired timing can be restrained accordingly as compared with the configuration in which the changes of both of the valve timings are restricted.

(5) By delaying the change start of valve timing VI of the intake valve by a predetermined period as compared with the change start of valve timing VE of the exhaust valve, a difference can be produced between the convergence speeds of the valve timings VI and VE to the control target values VTI and VTE.

The invention may be embodied in the following forms.

Figure 14:
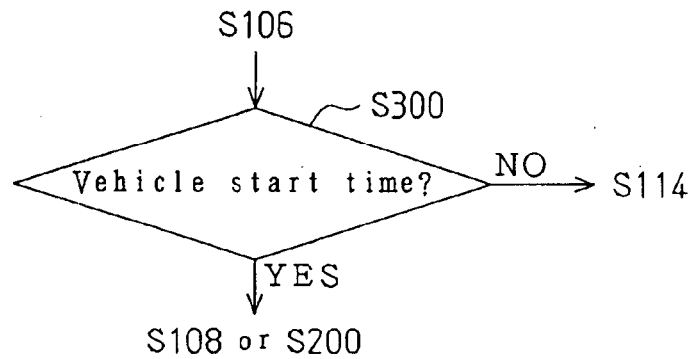
FIG. 14 is a flowchart showing a modification of valve timing change processing.

In the above-described embodiments, for example, as shown in FIG. 14, the upper limit guard processing may be executed under condition of vehicle start (Step S300: YES). According to this configuration, since it is necessary to increase an axle rotational speed from "0", the load applied to the crankshaft 11 at the time of increase start is liable to increase. Therefore, at the vehicle start time when the temporary stagnation of increase in engine rotational speed NE is liable to occur, the occurrence of "stagnation" can be restrained properly.

Figure 15:
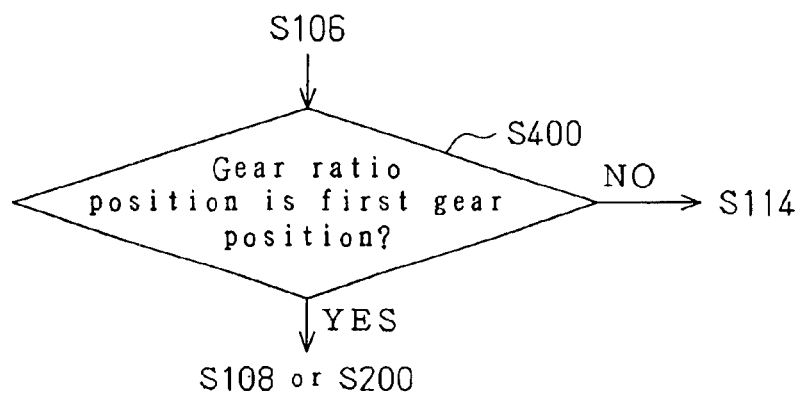
FIG. 15 is a flowchart showing a modification of valve timing change processing.

In the above-described embodiments, as shown in FIG. 15, the upper limit guard processing may be executed under condition that the first gear position is selected as the gear ratio position of the automatic speed change gear 20 (Step S400: YES). According to this configuration, when the gear ratio of the automatic speed change gear 20 is high, and the instability of vehicle behavior due to fluctuations of engine torque is liable to be caused, the instability can be restrained appropriately. For the vehicle equipped with a continuously variable transmission as the automatic speed change gear 20, the upper limit guard processing is only to be executed under condition that the gear ratio is higher than a predetermined value.

Figure 16:
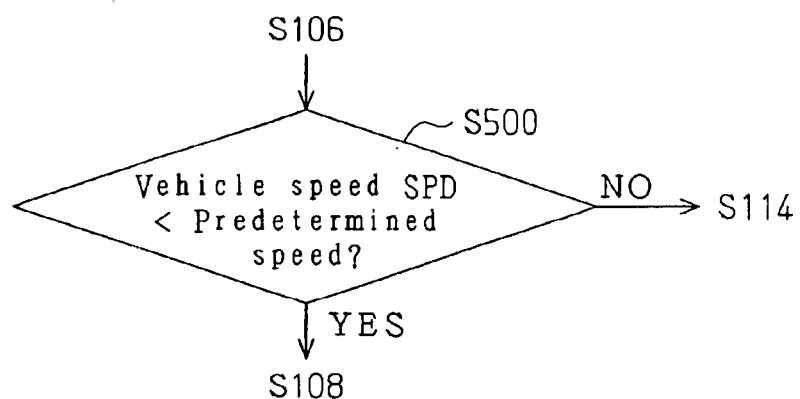
FIG. 16 is a flowchart showing a modification of valve timing change processing.

As shown in FIG. 16, the upper limit guard processing may be executed under condition that the vehicle speed SPD is lower than a predetermined speed (Step S500: YES). Usually, when the vehicle speed SPD is low, the gear ratio of speed change gear is set at a high ratio. Therefore, by this configuration as well, the instability of vehicle behavior can be restrained appropriately.

Figure 17:
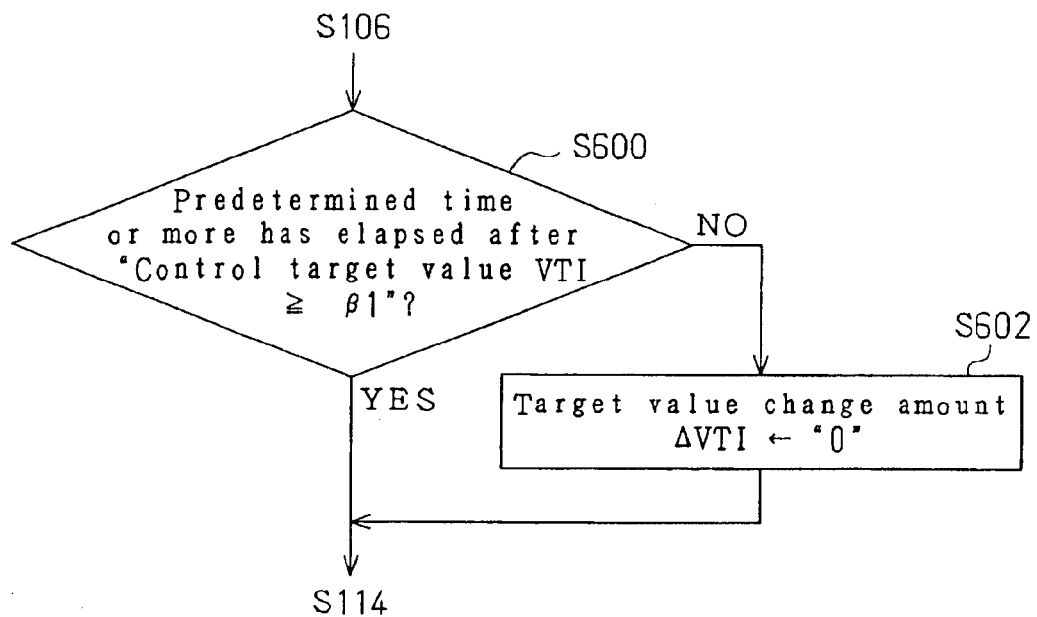
FIG. 17 is a flowchart showing a modification of valve timing change processing.
Figure 18:
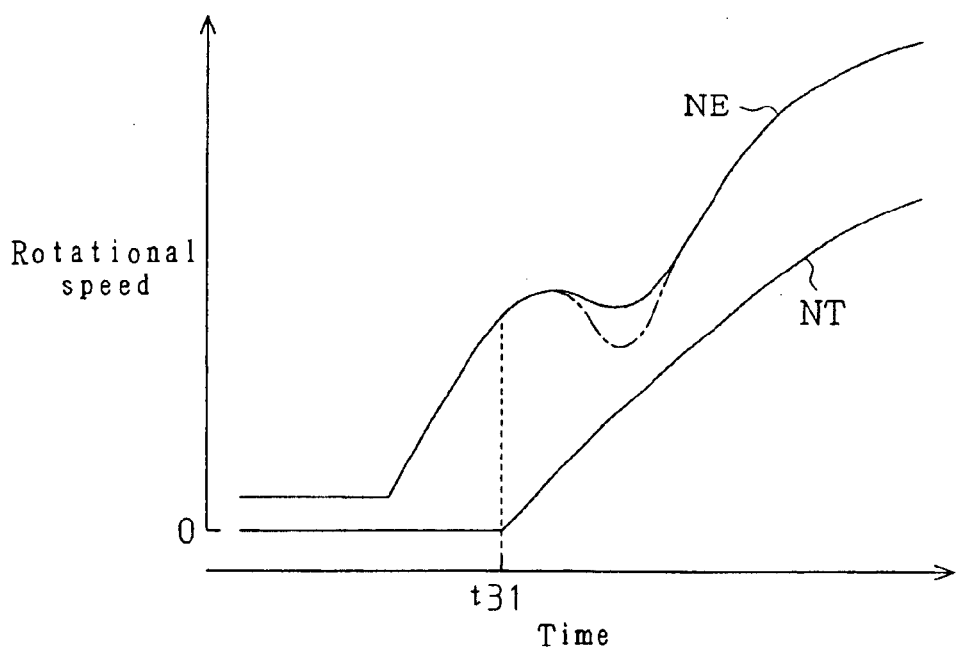
FIG. 18 is a timing chart showing one example of a conventional change in engine rotational speed at the time of vehicle start.

In the above-described first embodiment, processing for delaying the change start timing of valve timing VI may be executed in place of the upper limit guard processing during a period in which there is a fear of the occurrence of the above-described "stagnation". Such processing can be realized by processing shown, for example, in FIG. 17. In this processing, if a predetermined time or more has elapsed after the control target value VTI has become not smaller than the predetermined value β1 (Step S600: NO), "0" is set as the target value change amount ΔVTI (Step S602). In this case, the control target value VTI is not updated, and also the valve timing VI of intake valve is not changed. Subsequently, if the elapsed time exceeds the predetermined time (Step S600: YES), the update of control target value VTI is started based on the target value change amount ΔVTI calculated in the processing in Step S102, and thereby the change of valve timing VI is started.

Instead of this, the valve timing VI may be changed to the control target value VTI at a predetermined speed. According to this configuration, when the change of valve timing VI is restricted, a sudden change thereof, and hence a sudden change of engine torque can be restrained. As its change mode, various modes are possible, such as a change at a fixed speed and variable setting of change rate.

In these configurations, when it is judged that the variable valve timing mechanism 17 is in a locked state, the execution of processing for delaying the change start timing of valve timing VI or processing for changing the valve timing VI to the control target value VTI at a predetermined speed has only to be prohibited. Thereby, the lock by the lock mechanism 40 can be released quickly, and hence the decrease in follow-up performance of the valve timing VI to a desired timing can be restrained.

In the above-described first embodiment, when it is judged that the variable valve timing mechanism 17 is in a locked state, the lock by the lock mechanism 40 can be released quickly not only by compulsorily lifting the change restriction of valve timing VI but also by relaxing the restriction.

In the above-described first embodiment, when the control target value VTI is a value on the delay angle side of the predetermined value β1, it is judged that the variable valve timing mechanism 17 is in a locked state. Instead of this, the position of the lock pin 41 is directly detected, and from the fact that the detected position is a lock position or that the valve timing VI is a timing on the delay angle side of the predetermined timing, it may be judged that the variable valve timing mechanism 17 is in a locked state.

The configuration in accordance with the above-described first embodiment can be applied appropriately to an internal combustion engine equipped with the variable valve timing mechanism on the exhaust side instead of or in addition to the variable valve timing mechanism on the intake side.

In the above-described second embodiment, the degree of change restriction of the valve timing VI of intake valve may be set so as to be higher as the difference ΔVE increases. According to this configuration, the change of valve timing VI of the intake valve can be restricted so that a difference in the convergence speed between valves is a desired speed difference, and the temporary stagnation of increase in engine rotational speed NE can be restrained appropriately. Such a configuration can be realized by a configuration, for example, such that a smaller value is calculated as the upper limit value γ2 as the difference ΔVE increases.

In the above-described second embodiment, the processing in Step S106 for valve timing change processing may be omitted. This configuration can also be applied to an internal combustion engine that does not have the lock mechanism 40 and the lock mechanism 51.

The present invention can be applied to not only a hydraulically operated variable valve timing mechanism but also any variable valve timing mechanism of a fluid pressure operated type which is operated by a fluid such as air or water.

The present invention can be applied to not only the variable valve timing mechanism but also any variable valve actuation mechanism in which a valve lift is variably set instead of or in addition to the valve timing by appropriately changing the configuration thereof.

The present invention can be applied to an internal combustion engine mounted on a vehicle provided with a fluid coupling in place of the torque converter. The present invention can also be applied to an internal combustion engine mounted on a vehicle provided with not only the liquid clutch but also a friction clutch.

What is claimed is:

1. A control apparatus for an internal combustion engine, the engine having an intake valve and an exhaust valve, the apparatus comprising:

a variable valve actuation mechanism of a fluid pressure operated type, wherein the variable valve actuation mechanism changes a valve overlap amount of the valve opening period of the intake valve and the valve opening period of the exhaust valve according to the operating state of the engine;

a lock mechanism that selectively switches the variable valve actuation mechanism to a locked state and an unlocked state by using fluid pressure supplied to the variable valve actuation mechanism; and a controller that restricts an operation amount of the variable valve actuation mechanism such that increase in the valve overlap amount is restrained when the engine is in a transient operation state in which the output of the engine increases, wherein the controller judges whether the variable valve actuation mechanism is in the locked state, and if the controller determines that the variable valve actuation mechanism is in the locked state, the controller relaxes the restriction imposed on the operation amount of the variable valve actuation mechanism.

2. The apparatus according to claim 1, wherein the relaxation of the restriction imposed on the operation amount includes prohibition of the restriction imposed on the operation amount.

3. The apparatus according to claim 1, wherein, in order to restrict the operation amount of the variable valve actuation mechanism, the controller gradually changes an actual operation amount of the variable valve actuation mechanism to a target operation amount that corresponds to the engine operating state.

4. The apparatus according to claim 1, wherein, in order to restrict the operation amount of the variable valve actuation mechanism, the controller delays by a predetermined period a procedure for changing an actual operation amount of the variable valve actuation mechanism to a target operation amount that corresponds to the engine operating state.

5. The apparatus according to claim 1, wherein the engine is mounted on a vehicle, and wherein the controller regards a state in which a vehicle running speed is not more than a predetermined speed as one of conditions that must be met to restrict the operation amount of the variable valve actuation mechanism.

6. The apparatus according to claim 1, wherein the engine is mounted on a vehicle, and the vehicle has a speed change gear that is capable of changing the gear ratio, and wherein the controller regards a state in which the gear ratio is higher than a predetermined value as one of conditions that must be met to restrict the operation amount of the variable valve actuation mechanism.

7. The apparatus according to claim 6, wherein the speed change gear is capable of selectively switching among a plurality of gear ratio positions, and wherein the controller regards a state in which a predetermined low speed gear ratio position in the gear ratio positions is selected as one of the conditions that must be met to restrict the operation amount of the variable valve actuation mechanism.

8. The apparatus according to claim 1, wherein the engine is mounted on a vehicle, and wherein the controller regards a state in which the vehicle is starting as one of conditions that must be met to restrict the operation amount of the variable valve actuation mechanism.

9. The apparatus according to claim 1, wherein the variable valve actuation mechanism changes the valve timing of at least one of the intake valve and the exhaust valve.

10. A control apparatus for an internal combustion engine, the engine having an intake valve and an exhaust valve, the apparatus comprising:
a pair of variable valve actuation mechanisms of a fluid pressure operated type, wherein the variable valve actuation mechanisms change a valve overlap amount of the valve opening period of the intake valve and the valve opening period of the exhaust valve according to the operating state of the engine, one of the variable valve actuation mechanisms being an intake-side variable valve actuation mechanism that corresponds to the intake valve, and the other being an exhaust-side variable valve actuation mechanism that corresponds to the exhaust valve; and
a controller that restricts operation amounts of the variable valve actuation mechanisms such that increase in the valve overlap amount is restrained when the engine is in a transient operation state in which the output of the engine increases, wherein the controller sets the degree of the restriction imposed on the operation amount of the intake-side variable valve actuation mechanism to be greater than the degree of the restriction imposed on the operation amount of the exhaust-side variable valve actuation mechanism.

11. The apparatus according to claim 10, wherein the controller decreases the degree of the restriction imposed on the operation amount of the intake-side variable valve actuation mechanism as the difference between the actual operation amount of the exhaust-side variable valve actuation mechanism and a target operation amount of the exhaust-side variable valve actuation mechanism, which target operation amount corresponding to the engine operating state, is decreased.

12. The apparatus according to claim 10, wherein, in order to restrict the operation amounts of the variable valve actuation mechanisms, the controller gradually changes actual operation amount of each variable valve actuation mechanisms to a corresponding target operation amount that corresponds to the engine operating state.

13. The apparatus according to claim 10, wherein, in order to restrict the operation amounts of the variable valve actuation mechanisms, the controller delays by a predetermined period a procedure for changing an actual operation amount of each variable valve actuation mechanism to a corresponding target operation amount that corresponds to the engine operating state, and wherein the controller sets the predetermined delay period related to the intake-side variable valve actuation mechanism to be longer than the predetermined delay period related to the exhaust-side variable valve actuation mechanism.

14. The apparatus according to claim 10, wherein the engine is mounted on a vehicle, and wherein the controller regards a state in which a vehicle running speed is not more than a predetermined speed as one of conditions that must be met to restrict the operation amounts of the variable valve actuation mechanisms.

15. The apparatus according to claim 10, wherein the engine is mounted on a vehicle, and the vehicle has a speed change gear that is capable of changing the gear ratio, and wherein the controller regards a state in which the gear ratio is higher than a predetermined value as one of conditions that must be met to restrict the operation amounts of the variable valve actuation mechanisms.

16. The apparatus according to claim 15, wherein the speed change gear is capable of selectively switching among a plurality of gear ratio positions, and wherein the controller regards a state in which a predetermined low speed gear ratio position in the gear ratio positions is selected as one of the conditions that must be met to restrict the operation amounts of the variable valve actuation mechanisms.

17. The apparatus according to claim 10, wherein the engine is mounted on a vehicle, and wherein the controller regards a state in which the vehicle is starting as one of conditions that must be met to restrict the operation amounts of the variable valve actuation mechanisms.

18. The apparatus according to claim 10, wherein the variable valve actuation mechanisms change the valve timing of at least one of the intake valve and the exhaust valve.

19. A method for controlling an internal combustion engine, the engine having an intake valve and an exhaust valve, the method comprising:
changing a valve overlap amount of the valve opening period of the intake valve and the valve opening period of the exhaust valve according to the operating state of the engine by means of a variable valve actuation mechanism of a fluid pressure operated type;

selectively switching the variable valve actuation mechanism to a locked state and an unlocked state by using fluid pressure supplied to the variable valve actuation mechanism to activate a lock mechanism;

restricting an operation amount of the variable valve actuation mechanism such that increase in the valve overlap amount is restrained when the engine is in a transient operation state in which the output of the engine increases;

judging whether the variable valve actuation mechanism is in the locked state; and relaxing the restriction imposed on the operation amount of the variable valve actuation mechanism if it is judged that the variable valve actuation mechanism is in the locked state.

20. A method for controlling an internal combustion engine, the engine having an intake valve and an exhaust valve, the method comprising:

changing a valve overlap amount of the valve opening period of the intake valve and the valve opening period of the exhaust valve according to the operating state of the engine by means of an intake-side variable valve actuation mechanism of a fluid pressure operated type corresponding to the intake valve and an exhaust-side variable valve actuation mechanism of a fluid pressure operated type corresponding to the exhaust valve;

restricting operation amounts of the variable valve actuation mechanisms such that increase in the valve overlap amount is restrained when the engine is in a transient operation state in which the output of the engine increases; and setting the degree of the restriction imposed on the operation amount of the intake-side variable valve actuation mechanism to be greater than the degree of the restriction imposed on the operation amount of the exhaust-side variable valve actuation mechanism.

* * * * *